D. S. Gray,
Bee Hive.
No. 86,528. Patented Feb. 2, 1869.
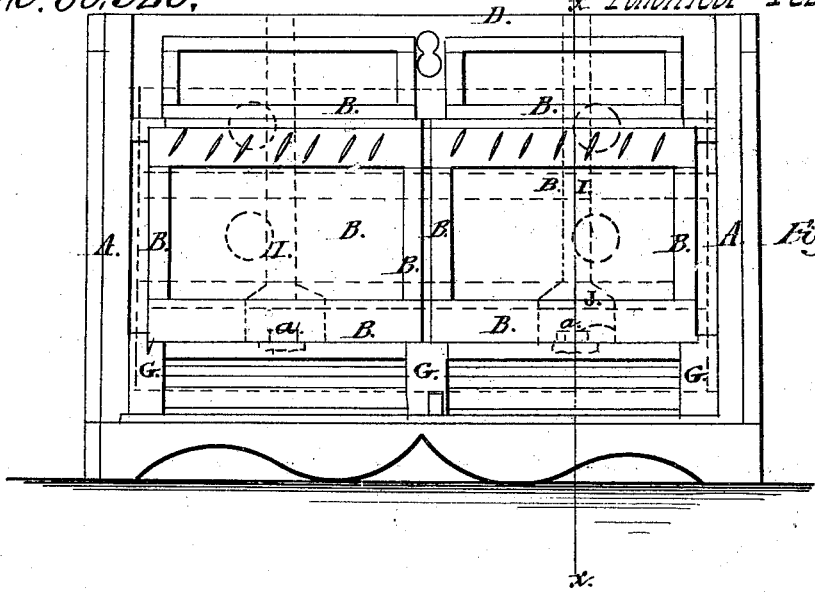
Fig. 1.
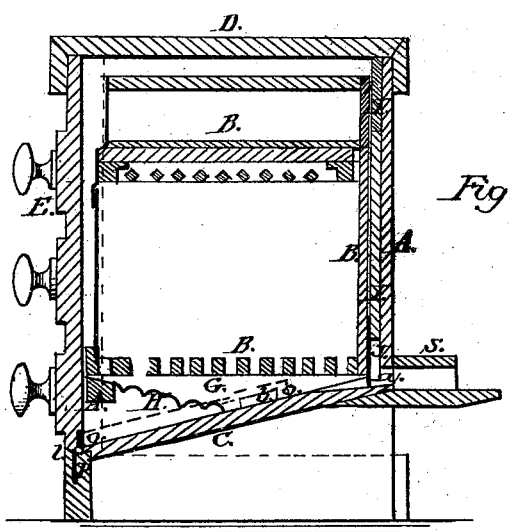
Fig. 2.
Fig. 3.
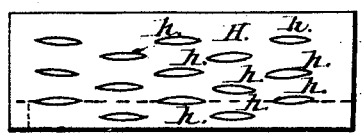
Witnesses:
W. E. Mars
L. L. Cushum
Inventor:
D. S. Gray

United States Patent Office.

DAVID S. GRAY, OF ONARGA, ILLINOIS, ASSIGNOR TO HIMSELF AND MOSES H. MESSER, OF THE SAME PLACE.

Letters Patent No. 86,528, dated February 2, 1869; antedated January 20, 1869.

IMPROVEMENT IN BEE-HOUSE.

The Schedule referred to in these Letters Patent and making part of the same.

*To all whom it may concern:*

Be it known that I, DAVID S. GRAY, of Onarga, in the county of Iroquois, and State of Illinois, have invented a new and useful Improvement in Bee-Houses; and I do hereby declare and make known that the following is a full, clear, and exact description of the same, reference being had to the accompanying drawings, and the letters and figures marked thereon, which form part of this specification.

My said invention relates to an improvement in the construction of bee-houses, in which the bee-hives are arranged without reference to the construction of the hives themselves.

My invention consists in arranging, in the bottom of the bee-house, or beneath the hives, when in position, a screen, with peculiar perforations, whereby the millers are induced to deposit their eggs in such a manner as to cause the moths to leave the hive, and thus free the bees from their destructive depredations, as hereinafter more fully described.

To enable those skilled in the art to construct and use my said invention, I will proceed to describe the same with particularity, making reference, in so doing, to the aforesaid drawings, in which—

Figure 1 represents a rear view of my invention, the door being opened, showing the interior, with two hives in position;

Figure 2 represents a cross-section through the bee-entrance and slide, taken at the line *x* in fig. 1; and Figure 3 is a plan view of the slide or screen, for the exclusion of millers and moths.

Similar letters of reference in the several figures denote the same parts of my invention.

A represents the exterior enclosure of the bee-house, provided with a sloping bottom, C, and a removable back, E, which is applied by inserting pins at *e*, secured, in its lower edge, into recesses in the enclosure below the door, as shown, the top of the removable rear being held securely in place by the cover D, which fits down over the same, as clearly shown in fig. 2, the cover being removed when it is desired to open the bee-house.

The said rear or door E may be constructed to represent a bureau, with drawers and knobs, when the bee-house may be arranged within a room in the dwelling-house, if desired.

B represents the position of the hives, two being represented in the bee-house, resting at the front, or at each side, upon partitions G, which separate the space below the hives into compartments appropriate to each hive.

It will be observed that the opening *a* in the front of the bee-house, through which the bees enter, opens beneath the lower edge of the hive, so that the bees enter the hive from below, and pass directly up into any part of the hive, without the necessity of entering upon one side, and passing across or through the hive, as there is a space open beneath the entire hive, as clearly seen in fig. 2.

J represents a metallic slide, which is attached to an upright arm, I, which moves up and down in a suitable groove in the exterior casing, as shown, so that, by taking hold of the top of the arm I, and moving it down or up, the apertures *a* may be entirely closed, or be regulated in size, for the purposes hereinbefore set forth.

H represents the perforated moth-screen before mentioned, which is inserted as a slide from the rear, inclining downward toward the front, and touching the bottom, C, at about the middle, so that the space below the hive is deepest at the middle, and grows shallower to front and rear, the screen aforesaid forming the rear slope, as shown in fig. 2, F being the frame or bar to which the screen is attached, and whereby it may be withdrawn, when desired, the said screen having its edges arranged in suitable grooves in the partitions G, to retain them in place, one screen being used for each of the hives.

Through the partitions G, which separate one hive from the adjoining one, an opening, *c*, is made, large enough to allow the queen-bee to pass through, and as much larger as desired, which is closed by a movable slide, *b*, which passes out at the rear, where it may be grasped by the hand and drawn out, to open the passage *c*, or moved in, to close it.

By this arrangement, inasmuch as the slide J enables the bee-manager to prevent the swarming of the bees through the exterior openings *a*, when it is desired to have a swarm leave any of the hives, an empty hive is placed next to the hive which the swarm is desired to leave, and the slide *b* is withdrawn, opening the passage *c*, when the queen and her swarm pass through into the empty hive, which they occupy, when the opening *c* is closed.

S represents a tube through which the bees pass, in going into or out from the hive, said tube being attached to the house at the openings *a*, so as to admit the bees through the tube into the space beneath the hives, said tube being important as serving as an alighting-board for the bees, and by forming a narrow passage, enables the bees to guard the entrance to the hive, and thus prevent the millers and other enemies of the bees from entering the hive.

But, should any millers enter through the said tube into the space beneath the hive, the peculiar shape of the openings *h* in the screen H, opening downward and forming a burr upon the under side, permits the millers to pass down through said openings into the close chamber beneath said screen, while they cannot pass back up through said openings *h*, and so are confined in said chamber, whence they may be taken and destroyed, by opening the rear of the house, as aforesaid.

The hives, shown in the drawings, are constructed with separate comb-frames, the exterior of the frames forming sections of the walls of the hive, and the rear of the hives is hinged at the bottom, so as to open downward, thus permitting the comb-frames to be spread apart, as might be necessary in removing them from the hive, or the rear of the hive may be made removable in any other suitable manner.

A spring may be arranged between the arms I of the slides J, and the sides of the vertical grooves in which they move, so as to hold them firmly in any desired position, after being adjusted.

Having described the construction and operation of my invention, I will specify what I claim as my invention, and desire to secure by Letters Patent.

I claim the slides H, when provided with perforations h, and arranged, in the bottom of the bee-house, in the manner and for the purposes specified.

D. S. GRAY.

Witnesses:
W. E. MARRS,
L. L. COBURN.